United States Patent [19]

Connell et al.

[11] Patent Number: 5,284,456

[45] Date of Patent: Feb. 8, 1994

[54] POWER TRANSMISSION BELT

[75] Inventors: John E. Connell, Littleton; Vicki C. Copeland, Lakewood; Herbert H. Frost, Littleton, all of Colo.

[73] Assignee: The Gates Rubber Company, Denver, Colo.

[21] Appl. No.: 919,430

[22] Filed: Jul. 23, 1992

[51] Int. Cl.⁵ .................................. F16H 57/04
[52] U.S. Cl. ...................... 474/91; 474/260; 474/268; 474/205
[58] Field of Search ............ 474/91, 204, 205, 260, 474/268, 263, 237; 156/137–142

[56] References Cited

U.S. PATENT DOCUMENTS

| | | |
|---|---|---|
| 3,621,727 | 11/1971 | Cicognani ........................ 474/91 X |
| 4,031,768 | 6/1977 | Henderson et al. ............ 474/265 X |
| 4,098,701 | 7/1978 | Burrill et al. .................... 427/387 X |
| 4,798,566 | 1/1989 | Sedlacek ......................... 474/263 X |
| 4,857,251 | 8/1989 | Nohr et al. ...................... 264/103 |
| 5,112,282 | 5/1992 | Patterson ........................ 474/260 |

Primary Examiner—Ramon S. Britts
Assistant Examiner—Roger J. Schoeppel
Attorney, Agent, or Firm—C. H. Castleman, Jr.; H. W. Oberg; S. G. Austin

[57] ABSTRACT

An endless power transmission belt has an elastomeric body portion, load carrying members embedded in the body portion, and a power transmitting surface integral with the body portion. The elastomeric body portion further includes material to mitigate unstable frictional behavior of the body portion responsible for initiating self-excited vibration at the power-transmitting surface.

18 Claims, 2 Drawing Sheets

5,284,456

POWER TRANSMISSION BELT

BACKGROUND OF THE INVENTION

1. Field of the Invention

This invention relates generally to endless power transmission belts and, more particularly, to improved belts having enhanced noise suppression capability. Specifically, the present invention relates to an improved endless belt in the form of a v-ribbed belt having an elastomeric composition including means for mitigating unstable frictional behavior of the belt in order to suppress noise generation and reduce pilling.

2. Description of the Prior Art

Many current automotive accessory drive systems employ a multi-ribbed v-belt to transmit power from the engine to the accessories. Most v-belt constructions associated with this application, as well as other endless belts such as power transmission belts, micro-ribbed belts, and the like, typically utilize neoprene, SBR, or polybutadiene-based polymer systems incorporating a variety of additives to enhance certain performance features. One performance characteristic of these belts which has become increasingly important to automotive original equipment and aftermarket applications over the past few years is that of quiet belt operation.

Examples of power transmission belts, v-belts, and micro-ribbed belts are disclosed in U.S. Pat. Nos. 3,138,962; 3,200,180; 4,330,287; and 4,332,576. Examples of formation of such belts are readily disclosed in U.S. Pat. No. 3,200,180 as indicated above and U.S. Pat. Nos. 3,772,928 and 4,066,732. These patent references are merely examples of the types of belts and state-of-the-art formation techniques thereof.

Under certain belt and drive conditions, multi-ribbed v-belts can exhibit an audible chirping or squealing noise. One solution to the noise problem in such belts has been to reduce the coefficient of friction of the sprocket engaging surface of the belt by isolating or removing as much of the elastomer as possible from near the surface of the belt when it comes in contact with sprocket teeth or flanges. Such an approach is taken in U.S. Pat. No. 3,772,929. Another manner of dealing with the noise generation problem is disclosed in U.S. Pat. No. 3,964,328 wherein a layer of elastomer impervious material is utilized during the casting operation and bonded to one side of a wear-resistant fabric.

Another approach taken to reduce noise generation in such belts has been to incorporate certain types of short length textile fibers into the belt undercord stock. This practice has been used not only to help inhibit noise but also to enhance wear properties. For particularly demanding belt applications, higher concentrations of textile fiber have been frequently required to ensure acceptable belt noise performance. However, difficulties have often been encountered in the mixing process when a large amount of fiber is to be dispersed into the rubber stock. Consequently, proper dispersion has usually required multiple passes through the mixer which is both time consuming and costly. Furthermore, large quantities of fiber incorporated into the rubber stock have been shown to be detrimental to certain other belt performance characteristics such as fatigue life.

Another problem experienced by multi v-ribbed belts is that of pilling, i.e., wear resulting in the formation of small balls of elastomer material between the ribs of the belt. Pilling can be a source of warranty problems from appearances as well as create noise and tracking problems. Belts to date have not yet effectively addressed this problem.

Consequently, there remains a need to produce a multi-ribbed or v-belt which is quiet during belt operation, reduces pilling and includes a noise suppression mechanism throughout the life of the belt even as it wears, yet does not affect other belt performance characteristics such as fatigue life, temperature resistance, and the like.

SUMMARY OF THE INVENTION

Accordingly, it is one object of the present invention to provide an improved elastomeric belt.

It is another object of the present invention to provide an endless power transmission belt having enhanced noise suppression characteristics.

It is yet another object of the present invention to provide a multi-ribbed belt having a low and stable coefficient of friction resulting in low noise characteristics during this operation.

Yet a further object of the invention is to provide a multi-ribbed belt resistant to pilling.

To achieve the foregoing and other objects and in accordance with a purpose of the present invention as embodied and broadly described herein, an endless power transmission belt is provided. The belt has an elastomeric body portion, load carrying members embedded in the body portion, and a power transmitting surface integral with the body portion. The elastomeric body portion also includes material to mitigate unstable frictional behavior of the body portion responsible for initiating self-excited vibration at the power transmitting surface.

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENTS

Figure 1:
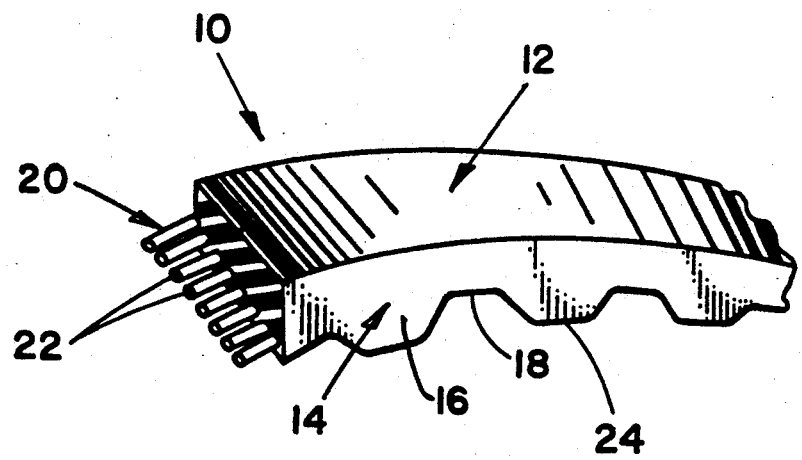
FIG. 1 is a perspective view, with parts in section, of a positive drive power transmission belt.

Referring to FIG. 1, a typical positive drive power transmission belt 10 is illustrated. The belt 10 includes an elastomeric main body portion 12 and a sprocket contact portion generally shown at 14 positioned along the inner periphery of the main body portion 12. This particular sprocket contact portion 14 is formed of alternating teeth 16 with outer surface 24 and land portions 18. A tensile layer 20 is positioned within the main body portion 12 for providing support and strength to the belt 10. In the illustrated form, the tensile layer 20 is in the form of a plurality of cords 22 aligned longitudinally along the length of the main body portion 12. It should be understood, however, that any type of tensile layer 20 known to the art may be utilized. Moreover, any desired material may be used as the tensile member such as cotton, rayon, nylon, polyester, aramid, steel and even discontinuous fibers oriented for load carrying capability. In certain prior art embodiments, the surface 24 was covered with a reinforcing fabric utilized to form a face cover to reduce friction as a belt 10 engages a sprocket.

Figure 2:
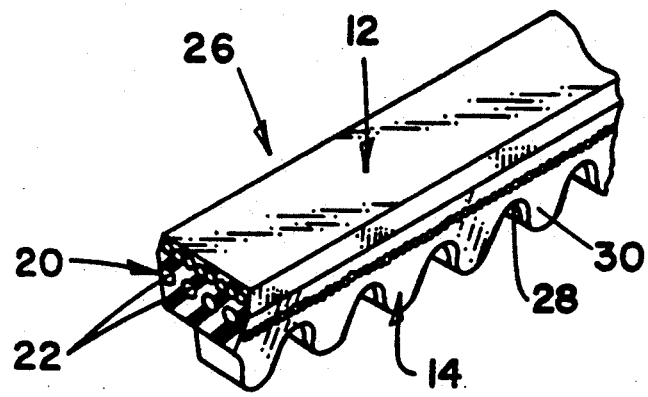
FIG. 2 is a perspective view, with parts in section, of a V-belt.

Referring to FIG. 2, a state of the art or standard V-belt 26 is illustrated therein. The V-belt 26 includes an elastomeric body portion 12 similar to that of FIG. 1 and a tensile reinforcement member 20 in the form of cords 22, also similar to that as illustrated in FIG. 1. The elastomeric body 12 and the cords 22 of the V-belt 26 are constructed from the same materials as described above for the belt of FIG. 1.

The V-belt 26 also includes a sheave contact portion 14 as in the power transmission belt of FIG. 1. In this embodiment, however, the sheave contact portion 14 is in the form of alternating notch surfaces of troughs 28 and tooth projections 30. These alternating notch surfaces 28 and tooth projections 30 preferably follow a generally sinusoidal path as illustrated which serves to distribute and minimize bending stresses as the sheave contact portion 14 passes around pulleys and sheaves.

Figure 3:
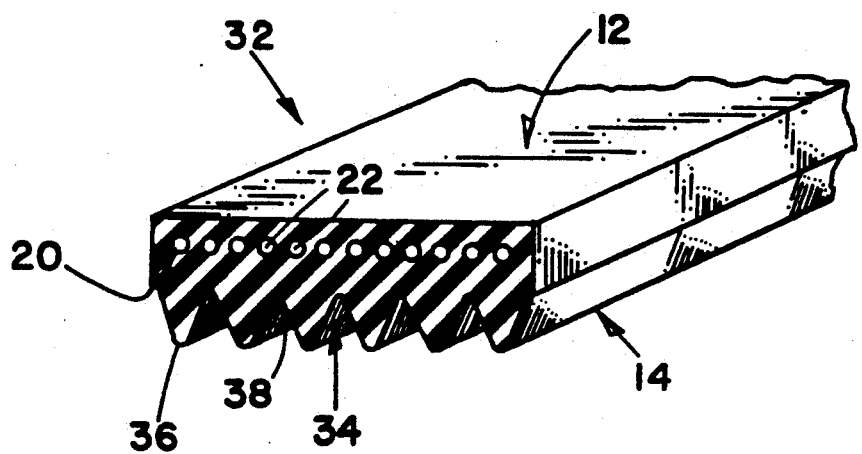
FIG. 3 is a perspective view, with parts in section, of multi-ribbed belt.

Referring now to FIG. 3, a multi-ribbed or micro-ribbed v-belt 32 is illustrated. The multi-ribbed belt 32 includes a main elastomeric body portion 12 as in the belts of FIGS. 1 and 2 and also includes a tensile reinforcement member 20 preferably in form of cords 22, also as previously described. The sheave contact portion 14 is in the form of a plurality of longitudinally aligned ribs 34 which include a plurality of raised areas or apexes 36 alternating with a plurality of trough areas 38 having oppositely facing sides which define driving surfaces of the belt 32. In each of these instances of FIGS. 1-3, the sheave contact portion 14 is integral with the main body portion 12 and formed from the same elastomeric material. While the present invention is particularly illustrated with reference to the embodiments shown in FIGS. 1 and 3 and in particular with reference to the V-belt and multi-ribbed V-belt of FIGS. 2 and 3, it should be understood that the present invention is not to be limited to these particular embodiments or forms as illustrated but rather is applicable to any endless belt construction within the scope of the claims as defined below.

There are a number of important factors relating to belt functionality which must be considered when evaluating belt performance. Among these factors include high and low temperature resistance which pertain to heat aging of the belt, elasticity or stretchiness which pertain to flex age and temperature, brittleness or heat age, and noise levels. In evaluating belt noise levels, there are several different types of belt noise created by different conditions and situations. One type of belt noise is that created by synchronous belts such as illustrated in FIG. 1 wherein noise is generated as a result of the impact between the teeth or land areas between the teeth of the belt and the sprockets (not illustrated) receiving the teeth. This type of noise is repeated every time a tooth enters the sprocket. This noise is principally a function of proper tooth and sprocket interaction, pitch fit and the like. However, friction is not the significant factor or primary source of noise in synchronous type belts.

In V-belts and multi v-ribbed belts as illustrated respectively in FIGS. 2 and 3, noise can be created from two other additional areas. The first of these other sources of noise is a result of pulley/belt interface misalignment. In order to maintain this particular noise level at a minimum, it is required that the belt and pulley maintain good alignment as the belt enters the pulley. If the belt and the pulley are not properly aligned, excessive radial sliding results and noise is created. The greater the angular misalignment between belt span and the pulley, the greater the potential for friction induced noise. The other source of belt noise is a result of belt slip due to improper tension. If the belt tension is too low, the belt tends to have a sliding movement within the pulley, and this friction source also creates noise.

As previously mentioned, one known technique for reducing noise in belts is to incorporate certain types of short length textile fibers into the belt elastomer in the cord stock, that is the sheave contact portion 14 of each of the belts illustrated in FIGS. 1-3. By increasing the fiber content in the belt, noise resulting from misalignment can be reduced considerably. Since noise is created in the belts and multi-ribbed belts as a result of the presence of self-excited vibration generated at the sliding interface between the belt and pulley, it was determined that a key element to resolving belt noise problems was a need to mitigate the unstable frictional behavior responsible for initiating self-excited vibration. While textile fibers incorporated in the sheave contact portion 14 were generally recognized as possessing an ability to stabilize such interfacial friction properties, the undercord fiber load has certain limitations in terms of the amount of fiber that can be carried. Moreover, it has been discovered that while the incorporation of fibers into the elastomer making up the sheave contact portion 14 will assist in reducing misalignment noise, it has been found to have no effect on noise created by friction from the sliding movement of the belt within the pulley due to improper tension. Thus, fiber content is not effective in mitigating the noise created by tangential sliding as opposed to misalignment or radial sliding. Moreover, it was also determined that it is important to sustain noise reduction for the life of the belt over a full range of operating conditions encountered in an under hood automotive application.

As a result of the above, it was discovered that the unstable frictional behavior of the sheave contact portion 14 which is responsible for initiating self-excited vibration at the power transmitting surface due to sliding, could be substantially reduced over the life of the belt by adding a noise mitigating compound to the elastomer of the belt 12. This mitigating material preferably has a low coefficient of friction compared to the elastomer, a low surface energy compared to the elastomer and an effective kinetic mobility to continuously refresh the power transmitting surface, i.e., the surface of the sheave contact portion 14, with the mitigating material during use of the belt throughout its life time. In preferred form, the mitigating material includes a siloxane incorporated throughout the entire elastomeric body portion 12 and 14. In more preferred form, a polysiloxane in a form of a silicone-based polymer/oil, and most preferably polydimethylsiloxane, is used. It has been found that the use of such a siloxane noise mitigating material substantially reduces low tension slip noise in the belt. However, it has been found that an improper siloxane level can increase misalignment noise. Therefore, the amount and viscosity of siloxane is important to control.

It has been found that the siloxane additive alleviates the unstable friction behavior associated with belt noise by modifying the belt surface thus preventing large scale regions of adhesion between the belt and pulley caused by friction. Such adhesive conditions are known to initiate the self-excited vibrations associated with belt noise. Belt noise testing, as detailed below, has shown the siloxane modified belt to be among the quietest belts compared to prior art and other state of the art belts.

Two factors appear to determine the siloxane's effect as a friction modifier. These factors are the siloxane's molecular weight or viscosity as well as its concentration level in the belt compound. Tests have suggested that these factors, if not properly selected, may cause a quiet belt to temporarily become noisy under extended periods of use in operation in a misalignment state. This regression to noisy behavior is reversible after letting the belt sit idle for a period of time. The elastomers which the siloxane additive are utilized with most frequently preferably include SBR (styrene-butadiene rubbers), polybutadiene and polychloroprenes such as neoprene. The preferred siloxane material includes any siloxane or other mitigating material which has a thermodynamic incompatibility with the rubber elastomeric compound utilized for the belt 12. In other words, it is preferred that there be a thermodynamic incompatibility between the siloxane and the base elastomer. The term "rubber" as used herein in respect to rubber elastomeric compounds or materials is meant to exclude cast, injection molded or RIM (reaction injected molded) type polyurethane elastomers (see U.S. Pat. No. 5,112,282 to Patterson, distinguishing rubber elastomers from such polyurethane elastomers in power transmission belt applications).

It has been found that the viscosity of the mitigating siloxane material is a crucial factor in determining its ability to optimally reduce noise. This is due to the fact that the viscosity of the siloxane determines its ability to migrate through the elastomer to the belt surface in order to lubricate the surface and stabilize friction. The viscosity can be too high as to have insufficient lubrication due to an inability to migrate through the elastomer. It can also be too low so as to accelerate migration and increase volatility at the surface. It has been found that siloxane material having a viscosity of greater than about 100 centistokes is too high and less than two centistokes is too low and unstable. In preferred form, a siloxane viscosity of approximately 5-20 centistokes is more preferred, and a most preferred viscosity range includes a viscosity of approximately 10-20 centistokes at a 0.5-3.0 percent by weight loading.

The incorporation of siloxane into the belt elastomer has also been found to effectively reduce pilling, that is belt surface wear resulting in balls of material between ribs. Pilling causes appearance problems, is a source of noise, and can cause tracking problems due to rib deformation in more severe cases. The siloxane additive material reduces such pilling formation as a belt wears.

Figure 4:
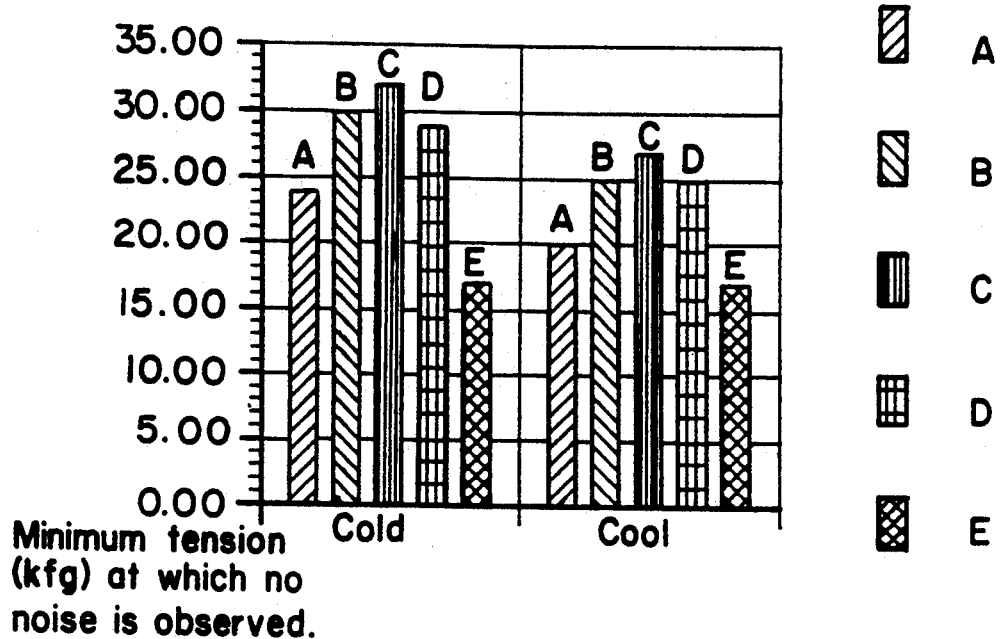
FIG. 4 is a bar graph illustrating the results of slip noise tests comparing belts utilizing the present invention with other standard belts.
Figure 5:
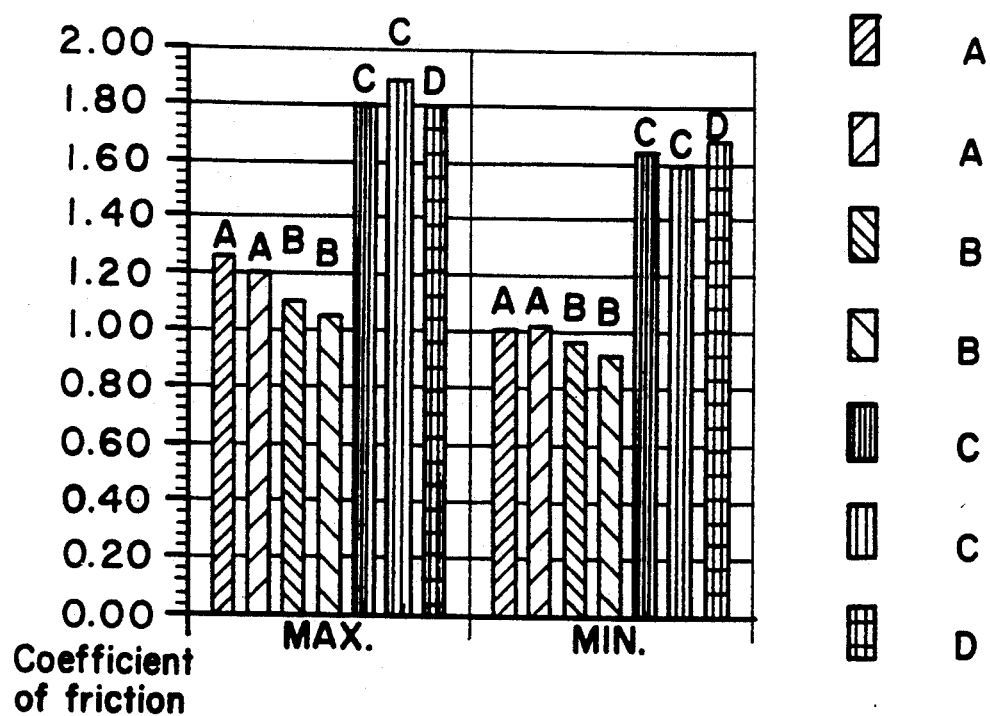
FIG. 5 is a bar graph illustrating coefficient of friction data for various belts with some belts utilizing the present invention.

Referring now to FIGS. 4 and 5, various multi v-ribbed belts were constructed to test the use of a siloxane mitigating material to reduce noise as compared to standard V-belt material constructions. In addition, textile fibers were included in some of the belts in various amounts in order to test the relationship between the level of mitigating material and fiber content.

EXAMPLE I

In referring to FIG. 4, noise test comparison results are illustrated between four standard rubber belts A-D and a rubber belt E containing 5 phr (per hundred parts rubber) polydimethylsiloxane (PDMSO). The belts were tested at minimum tension and at both cold (about 0° C.) as well as cool (about 25° C.) temperatures. It will be noted from FIG. 4 that the slip noise level is substantially lower for belts E at both cold and cool temperatures as compared to standard belts A-D without any. It should also be noted that the slip noise level was the same for belt E constructed in accordance with the present invention at both cold and cool temperatures, whereas noise levels increased for all four standard belts A-D at colder temperatures.

EXAMPLE II

FIG. 5 illustrates several belts constructed in accordance with the present invention having different levels of fiber materials as well as other belts constructed having different level of fiber materials and different types of oil materials. It should be noted in FIG. 5 that belts A were constructed having 1.8 phr PDMSO at 10 centistokes with 15 phr cotton fibers, while belts B were constructed having 1.8 phr PDMSO at 10 centistokes with 18 phr cotton. As a comparison, a standard belt construction having 15 phr cotton fibers with 18 phr paraffinic oil was made as belts C, and belts D included four phr DOS oil with 12.5 phr cotton fiber. From FIG. 5, the results clearly indicate that the coefficient of friction levels for belts A and B are substantially lower than the coefficient of friction levels for belts C and D. Thus, the present invention clearly lowers the coefficient of friction and thereby promotes a more stable sliding interface which results in the lower noise levels produced by the present invention.

EXAMPLE III

Other tests clearly illustrated that while the viscosity of the silicone material can vary from two centistokes to 100 centistokes and still produce a low coefficient of friction, the coefficient of friction was lowest at 10 centistokes when belts having 2, 5, 10 and 100 centistokes were tested. In one instance, however, a belt having 100 centistokes PDMSO produced a low coefficient of friction, but only in the instance where the material was present in a much higher concentration level as compared to other belts. Thus, while the lower viscosity materials will tend to flow more evenly and appropriately through the belt to constantly refresh the surface, if enough of the material is included in the belt, a higher viscosity material will function as well.

As can be seen from the above, the present invention provides an improved elastomeric belt construction. The belt in accordance with the present invention has an ability to maintain a low coefficient of friction at the surface of the belt and sheave interface, thereby maintaining slip noise level of the belt at a very low level. Thus, the belt of the present invention is very quiet during operation throughout its life time due to its ability to constantly refresh the surface of the belt with material which mitigates the noise level. The present invention also operates to reduce pilling during use and wear of the belt.

The foregoing description and the illustrative embodiments of the present invention have been described in detail in various modifications and alternative embodiments. It should be understood, however, that the foregoing description of the invention is exemplary only, and that the scope of the invention is limited only to the claims as interpreted in view of the prior art.

What is claimed is:

1. In an endless power transmission belt having rubber elastomeric body portion, load carrying members embedded in said body portion and a power-transmitting surface integral with said body portion, the improvement wherein said elastomeric body portion further comprises means to stabilize the coefficient of friction and reduce pilling at said power-transmitting surface said means comprising the presence of a siloxane having a viscosity of about 2 to about 100 centistokes in the body portion at said power-transmitting surface.

2. The improvement of claim 1, wherein said stabilizing means comprises a siloxane material interspersed throughout said elastomeric body portion, said material having a low coefficient of friction compared to that of the elastomer, a low surface energy compared to that of the elastomer, and an effective kinetic mobility of sufficient activity to continuously refresh said power-transmitting surface with said material during use of said belt.

3. The improvement of claim 1, wherein said stabilizing means comprises a siloxane incorporated throughout said elastomeric body portion.

4. The improvement of claim 1, wherein said siloxane comprises a polysiloxane.

5. The improvement of claim 4, wherein said polysiloxane comprises polydimethylsiloxane.

6. The improvement of claim 1, wherein the endless power transmission belt is a synchronous belt.

7. The improvement of claim 1, wherein said siloxane has a viscosity of from about 5-20 centistokes.

8. The improvement of claim 7, wherein said siloxane comprises a polysiloxane having a viscosity of from about 10-20 centistokes at a 0.5-3.0 percent by weight loading.

9. The improvement of claim 1 wherein the endless power transmission belt is a V-belt or a multi-ribbed V-belt.

10. The improvement of claim 9 wherein embedded in the elastomeric body portion of the belt are textile fibers, such fibers being present at the power-transmitting surface of the belt.

11. An endless power transmission belt of the V- or multi-ribbed V-type having opposing friction surfaces comprising a rubber elastomeric body portion, tensile members embedded in said body portion, and a power-transmitting surface including said opposing friction surfaces, said power transmitting surface being integral with said body portion, and said elastomeric body portion including siloxane interspersed throughout the elastomer of said body portion in an amount and viscosity during use of the belt to continuously lubricate said friction surfaces to suppress noise and pilling.

12. The belt as claimed in claim 11, wherein said siloxane lubricant material has a low coefficient of friction compared to the elastomer, a low surface energy compared to the elastomer, and an effective kenetic mobility of sufficient activity to continuously migrate to said power-transmitting surface during use of said belt.

13. The belt as claimed in claim 12, wherein said siloxane comprises a polysiloxane having a viscosity of from about 2-100 centistokes.

14. The belt as claimed in claim 11, wherein said siloxane comprises a polysiloxane having a sufficiently effective viscosity so as to provide a rate of migration through said body portion to said power-transmitting surface to effectively suppress belt noise and reduce pilling at said power-transmitting surface.

15. The belt as claimed in claim 11, wherein said lubrication means comprises a polysiloxane incorporated throughout said elastomeric body portion.

16. The belt as claimed in claim 15, wherein said polysiloxane is present in a range in an amount of approximately 0.5-3.0 percent by weight in said body portion and has a viscosity in a range of about 5-20 centistokes.

17. In an endless power transmission belt having an elastomeric body portion, load carrying members embedded in said body portion and a power-transmitting surface integral with said body portion, the improvement wherein said elastomeric body portion further comprises means to stabilize the coefficient of friction at the power-transmitting surface of the belt, said means comprising polydimethylsiloxane.

18. In an endless power transmission belt having an elastomeric body portion, load carrying members embedded in said body portion and a power-transmitting surface integral with said body portion, the improvement wherein said elastomeric body portion further comprises a polysiloxane distributed throughout the elastomeric body portion said polysiloxane having a viscosity of 10-20 centistokes at a range of 0.5-3.0 percent by weight serving to stabilize the coefficient of friction of the power-transmitting surface of the belt.

* * * * *